United States Patent [19]

Dimmig

[11] 4,066,631
[45] Jan. 3, 1977

[54] PROCESS FOR PREPARATION OF LINEAR POLYAMIDE-IMIDES FROM AROMATIC TRICARBOXYLIC ACID ANHYDRIDES AND DIAMINES

[75] Inventor: Daniel Ashton Dimmig, King of Prussia, Pa.

[73] Assignee: Pennwalt Corporation, Philadelphia, Pa.

[21] Appl. No.: 578,711

[22] Filed: May 19, 1975

[51] Int. Cl.$^2$ ............................................. C08G 73/14
[52] U.S. Cl. .............................. 260/78 R; 260/47 CZ; 260/47 CP; 260/49; 260/78 TF; 260/78 UA
[58] Field of Search ............ 260/78 E, 78 TF, 47 CZ, 260/47 CP, 49, 78 UA

[56] References Cited

U.S. PATENT DOCUMENTS

| 3,852,106 | 12/1964 | Incremona et al. | 117/218 |
| 3,954,710 | 5/1976 | Bower et al. | 260/47 CP |

Primary Examiner—Lester L. Lee
Attorney, Agent, or Firm—Plumley and Tyner

[57] ABSTRACT

Linear polyamide-imides having recurring units of the formula

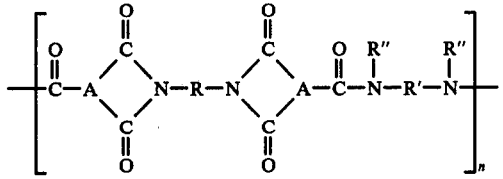

in which

A is an aromatic radical;

R and R' are araliphatic, aliphatic, or cycloaliphatic radicals; and

R" is H, or an aliphatic, araliphatic, or cycloaliphatic radical; and a process for their preparation are disclosed.

The process involves three steps (1) condensation of a diamine and an aromatic tricarboxylic acid anhydride to form an intermediate diimide-diacid; (2) converting the diimide-diacid to the diacid chloride, e.g. by reaction with $SOCl_2$; and (3) reaction of the diacid chloride with further diamine to produce the amide linkages in the desired polyamide-imide. This method avoids a final step of imide formation by cyclodehydration, necessary in the prior art processes, which step causes some crosslinking undesirable in polymers intended for molding applications.

5 Claims, No Drawings

PROCESS FOR PREPARATION OF LINEAR POLYAMIDE-IMIDES FROM AROMATIC TRICARBOXYLIC ACID ANHYDRIDES AND DIAMINES

A. BACKGROUND OF THE INVENTION

A number of polyimide and polyamide-imide polymers are known. In general, polymers of this category have been prepared from aromatic reactants. An example is the polyimide prepared from pyromellitic dianhydride and oxydianiline:

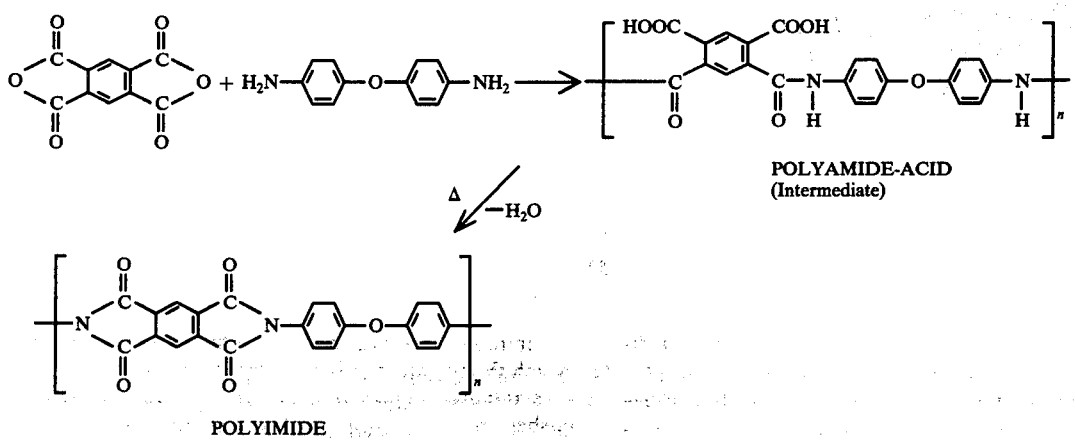

This aromatic polyimide exhibits an outstanding combination of thermal, mechanical and electrical properties, but is essentially insoluble and infusible. The intermediate poly-(amide-acid) is processible with specialized techniques which involve a final cure, usually by heating, to obtain cyclodehydration to the polyimide.

Recognition of the exceptional thermal stability of the aromatic imide ring led to increased efforts to design polymers which contained the imide function but could be more easily processed. One result was a series of polyamide-imide resins derived from trimellitic anhydride and primary, aromatic diamines, a typical example being the polymer prepared from 4,4'-methylenedianiline as the aromatic diamine;

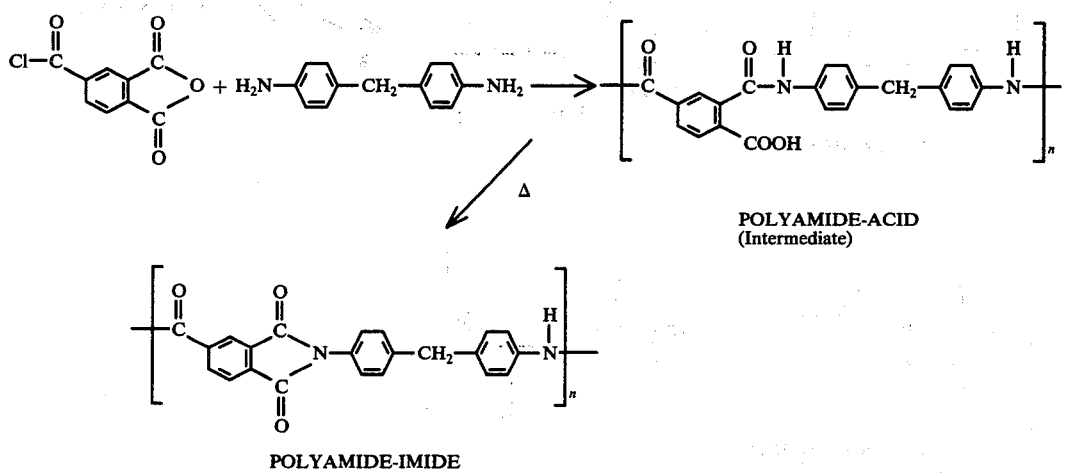

This polymer is soluble in certain polar solvents and has better thermoplastic qualities making it somewhat easier to process. However, its melt characteristics and thermoplastic qualities are generally not good enough to make it suitable for molding applications.

Recent patent literature also contains numerous examples of wire-coating resins prepared from trimellitic anhydride (TMA), pyromellitic anhydride, ethylene glycol, and 4,4'-methylenedianiline. These resins are thermosetting resins of complex structure.

Two of the most promising prior art synthetic routes to polyamide-imides having reasonably good properties are as follows:

(a) Intermediate Dianhydride Route

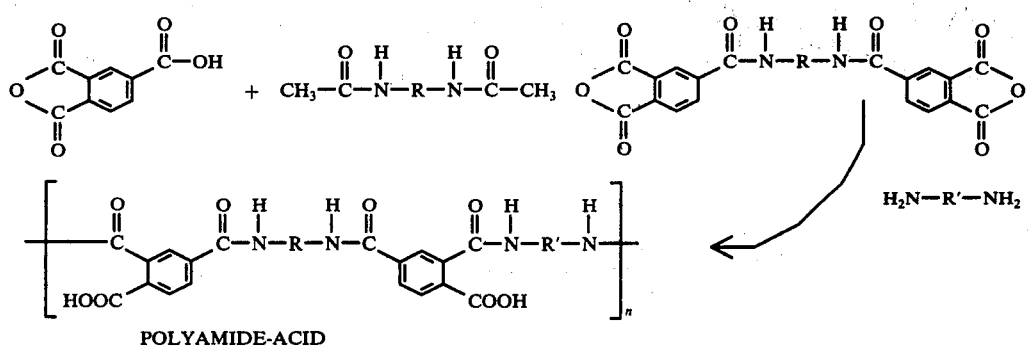

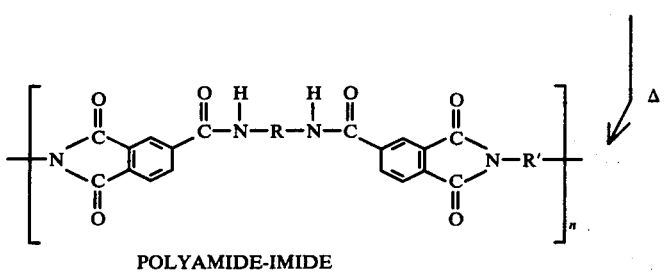

POLYAMIDE-IMIDE (b) Direct Route via Trimellitoyl Chloride

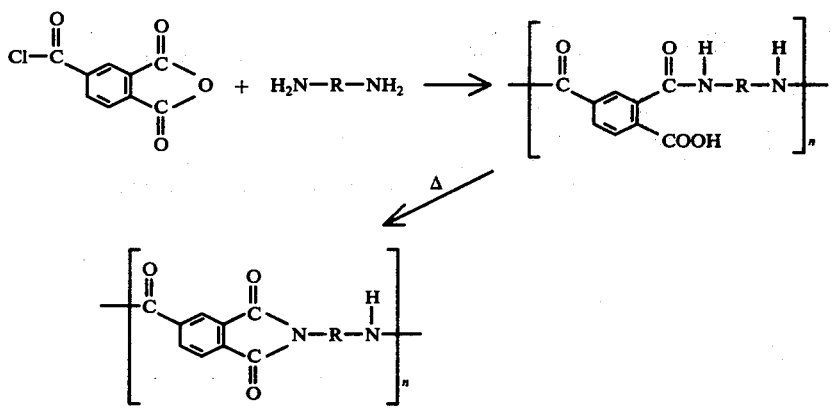

Routes (a) and (b) involve formation of an intermediate polyamide-acid, which is subject to hydrolytic chain scission. Also, crosslinking detrimental to good thermoplastic character which is desirable in a molding resin, can occur during the final cyclodehydration step at elevated temperatures.

Thus, the known polyimides and polyamide-imides are characterized by poor melt or solubility properties, or both, which detract from their utility in many applications particularly in molding operations.

B. BRIEF SUMMARY OF THE INVENTION

One aspect of this invention relates to a process for preparing highly linear polyamide-imides from aromatic tricarboxylic acid anhydride and diamines having the amino groups attached to aliphatic carbon atoms in which the possibility of cross-linking during synthesis is substantially reduced or eliminated. This is accomplished in a three step reaction sequence which eliminates a final cyclodehydration step common to several of the methods known in the prior art. The process comprises the steps of (1) condensation of a diamine having its amino groups attached to aliphatic carbon atoms and an aromatic tricarboxylic acid anhydride to form an intermediate diimide-diacid; (2) converting the diimidediacid to the diacid chloride, for example, by reaction with $SOCl_2$; and (3) reaction of the diacid chloride with further diamine to produce the amide linkages in the desired polyamide-imide.

The process can be illustrated as follows:

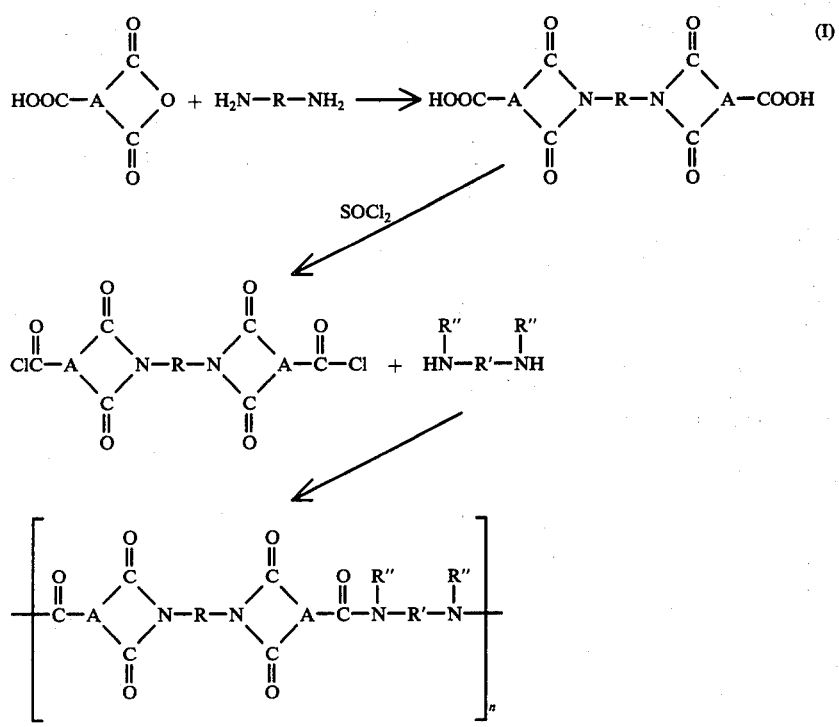

in which

A is an aromatic radical;

R and R' are araliphatic, aliphatic or cycloaliphatic radicals in which the carbon atoms attached to each N are aliphatic carbon atoms;

R" is H, or an araliphatic, aliphatic or cycloaliphatic radical.

A second aspect of this invention relates to polyamide-imides having recurring units as shown in formula I, in particular, the highly linear thermoplastic polyamide-imides of formula I prepared by the above-process which avoids a final step of cyclodehydration. These polyamide-imides are prepared from diamines which have their amino groups attached to aliphatic carbon atoms.

C. DETAILED DESCRIPTION OF THE INVENTION

The process of this invention is broadly applicable to the preparation of polyamide-imides of the formula I within certain confined limits. Since the essential object of the process is the preparation of linear thermoplastic polymers, the reactants must be di-functional so that crosslinking and the formation of polymer networks is precluded. For the purposes of this invention, the aromatic tricarboxylic anhydride is considered difunctional; the carboxyl group and the anhydride group being considered the two functional groups. Non-functional substituents such as alkyl groups, and alkoxy groups especially those having 1–4 carbon atoms; and halogen, particularly Cl or Br, may be present on the aromatic ring. Similarly, the amines $H_2N-R-NH_2$ and $HR''N-R'-NR''H$ which may be the same or different are di-functional in that the only substituents permitted in —R—, —R'— and —R" are not reactive in the process. The, same substituents mentioned above for the aromatic ring can be present in the —R—, —R'— and —R" radicals as well as substituents such as carbonyl.

Useful aromatic tricarboxylic acid anhydrides include those compounds containing at least one pair of carboxyl groups in ortho position with respect to each other or otherwise situated in a fashion which permits the formation of an anhydride structure, one other carboxyl group and from 9 to 18 carbon atoms. Within these limits, these compounds may contain one or more benzenoid rings such as, for instance, trimellitic anhydride and its isomers and multi-ring compounds such as the 1,8-anhydride of 1,3,8-tricarboxylnaphthalene. The aromatic radical A in the aromatic tricarboxylic acid may be a radical of benzene, naphthalene, biphenyl, diphenyl ether, diphenyl sulfide, diphenyl sulfone, ditolyl ether, and the like, which may be substituted as indicated above. The preferred aromatic tircarboxylic acid anhydride is trimellitic anhydride.

The diamines $H_2N-R-NH_2$ and $HR''N-R'-NR''H$ which are useful in this invention include those in which R and R' are araliphatic, aliphatic or cycloaliphatic radicals in which the carbon atom attached to each N is an aliphatic carbon atom, and R" is H, or araliphatic, aliphatic or cycloaliphatic radical. Preferably, R and R' contain 2 to about 18 carbon atoms and R" contains 1 to about 10 carbon atoms. The aliphatic radicals R and R' can be alkylene radicals especially those having 2–18 carbon atoms, but corresponding aliphatic radicals containing ethylenic unsaturation and those containing hetero atoms in the chain such as —O— and —S— are also contemplated. Most preferably, R" is H or both R" radicals taken together form an alkylene radical.

The cycloaliphatic radicals R and R' contain from 3 to 8 carbon atoms in the ring and can be hydrocarbon radicals, including radicals with unsaturation, or heterocyclic radicals. Also, the two R" substituents in the amine $HR''N-R'-NR''H$ can combine to form a divalent aliphatic radical. Accordingly, the amine containing the R' radical may have its two amino nitrogens as part of a heterocyclic ring as in piperazine, for example.

As aromatic radicals in R, R' and R" (including the aromatic portion of the araliphatic radical), there may be mentioned the hydrocarbon radicals having 6 to 10 carbon atoms particularly the phenyl and phenylene radical, but heterocyclic aromatic radicals are also contemplated.

In view of the requirement that the N atoms be attached to aliphatic carbon atoms, the araliphatic radicals contemplated are those having the general structure -aliphatic-aromatic-aliphatic- in which the aromatic and aliphatic radicals are defined as above especially where the total number of carbon atoms in the araliphatic radical is 8 to 18 carbon atoms.

Representative amines $H_2N—R—NH_2$ and $HR"N—R'—NR"H$ are the alkylene diamines especially those in which the alkylene group contains 2 to 18 carbon atoms for example, ethylene diamine, hexamethylene diamine, and 2,2,4- and 2,4,4-Trimethylhexamethylene-diamine, cycloaliphatic amines such as cyclohexane diamine, piperazine, isophorone diamine and 1,3-Bis(4'-piperidyl) propane; araliphatic amines such as xylylene diamine.

As already indicated the process of this invention can be summarized as comprising the steps of (1) condensation of a diamine having its amino groups attached to aliphatic carbon atoms and an aromatic tricarboxylic acid anhydride to form an intermediate diimide-diacid; (2) converting the diimide-diacid to the diacid chloride, for example, by reaction with $SOCl_2$; and (3) reaction of the diacid chloride with further diamine to produce the amide linkages in the desired polyamide-imide.

In the Step 1, a diamine is condensed with an aromatic tricarboxylic acid anhydride to form the intermediate diimide-diacid. Preferably, the reaction is conducted in a single step. For example, a 2:1 molar mixture of the tricarboxylic acid anhydride and the diamine, respectively, are refluxed at 105°-110° C in a mixture of dimethylformamide and toluene. Water formed in the cyclodehydration is continuously removed to drive the reaction to completion. An additional quantity of tricarboxylic acid anhydride (5-10% of the initial charge) can be added during the reaction to avoid formation of the intermediate 1:1 anhydride-diamine product:

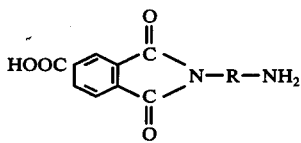

In place of the toluene as a water azeotroping agent one may use benzene or the isomeric xylenes. Although dimethyl formamide (DMF) is the preferred solvent, other solvents with boiling points greater than 100° C can be used.

Less preferably, the intermediate diimide-diacid can be made by the prior art process described in U.S. Pat. No. 3,051,724 which is incorporated herein by reference. The process of U.S. patent involves two steps in which the diamine is first condensed with the tricarboxylic acid anhydride in a suitable solvent, e.g., acetone at ambient temperature, to form the intermediate diamide-acid which is isolated and heated in a second stage in an inert liquid at a relatively high temperature to form the diimide-diacid via cyclodehydration.

In Step 2 the diimide-diacid is converted to the diacid chloride by reaction with inorganic chlorine compounds, e.g., thionyl chloride or phosphorus chlorides (Laboratory Methods of Organic Chemistry by Gattermann and Wheland, 1938, p. 121). Solvents in which the diacid chloride is at least partially soluble are beneficial. Such solvents include the aromatic hydrocarbons such as benzene, toluene and the xylenes, and chlorinated aliphatic or aromatic hydrocarbons such as methylene chloride, chloroform, chlorobenzene and the like.

Step 3 involves polycondensation of the diacid chloride, with a diamine. This step is advantageously conducted by the interfacial polycondensation technique in which a two-phase mixture consisting of an aqueous phase containing the diamine and an organic solvent phase containing the diacid chloride, is vigorously agitated. The aqueous phase contains an acid acceptor. Useful acid acceptors include alkali metal carbonates, alkali metal hydroxides, alkaline earth hydroxides and an excess of the diamine. The organic solvent in the nonaqueous phase is a solvent for the diacid chloride and can be any of the solvents mentioned above for use in Step 2. Optionally, a surfactant can be employed in the polymerization.

Step 3 can also be conducted by melt-polymerization of the intermediate diimide-diacid with a diamine via "nylon salt" formation based on polyamide technology.

The process steps are illustrated in the following examples.

D. THE EXAMPLES

EXAMPLE I

A. Preparation of the diacid chloride of 2,2'-hexamethylenebis (1,3-dioxo-5-isoindolinecarboxylic acid)

To 800 ml. of dimethylformamide in a 2000 ml. reaction flask, with stirring, was added 230.5 g. (1.2 moles) of trimellitic anhydride (TMA). To the stirred suspension was added a solution of 69.7 g. (0.6 mole) of hexamethylene diamine in 300 ml. of toluene. The clear, yellow solution was refluxed for one hour with the removal of water in a Dean-Stark trap. An additional 23.0 g. (0.12 mole) of trimellitic anhydride was added and the mixture was refluxed for an additional two hours. The reaction mixture was then allowed to cool and stand overnight. The solid product was separated by filtration and washed consecutively in a Waring Blendor with dimethylformamide and acetone. The solid was dried at 100° C in a vacuum oven for 16 hours. Conversion — 84%. The product, 2,2'-hexamethylenebis (1,3-dioxo-5-isoindolinecarboxylic acid), (abbreviated 6-Bis TMA) is calculated to have 62.06% carbon; 4.34% hydrogen and 6.03% nitrogen. Analysis showed: 62.06% carbon; 4.32% hydrogen and 6.16% nitrogen. A N.E. of 232 (theory-232) was obtained.

To 300 ml. of toluene in a 1000 milliliter flask, with stirring, was added 92.9 g. (0.20 mole) of the above diimide-diacid (6-Bis TMA) and 150 ml. (2.0 moles) of thionyl chloride. The mixture was refluxed, with stirring, for 5 hours. After standing overnight at room temperature, the solid product was separated by filtration and washed with cold toluene. The solid product was recrystallized from toluene in two fractions and freed of solvent in a vacuum oven at 80° C. Conversion — 85%; m.p. 172°-174° C. The product (diimide-diacid chloride) is calculated to have 57.50% carbon; 3.62% hydrogen and 14.14% chlorine. Analysis showed: 57.67% carbon; 3.93% hydrogen and 13.92% chlorine.

B. Preparation of polyamide-imide from above diimide-diacid chloride.

A blending apparatus was charged with 150 ml. of water, 2.32 g. (0.02 mole) of hexamethylenediamine, 4.24 g. (0.04 mole) of sodium carbonate, and 0.5 g. of sodium lauryl sulfate. A solution of 10.03 g. (0.02 mole) of the diacid chloride of 6-Bis TMA in 150 ml. of chloroform was added to the vigorously stirred aqueous solution. The mixture was stirred for an additional five minutes. The polymer was isolated by filtration, washed thoroughly with water and methanol, and freed of solvent in a vacuum oven at 100° C. for 6 hours. The polymer had an inherent viscosity of 1.82 dl/g. (0.5 g. of polymer in 100 ml. of m-cresol at 30° C) and a softening point of approximately 260° C (DSC). A clear, melt-pressed film was obtained at 280° C.

EXAMPLE II

A blending apparatus was charged with 150 ml. of water, 1.20 g. (0.02 mole) of ethylenediamine, 4.24 g. (0.04 mole) of sodium carbonate, and 1.0 g. of sodium lauryl sulfate. A solution of 10.03 g. (0.02 mole) of the diacid chloride of 6-Bis TMA in 150 ml. of chloroform was added to the vigorously stirred aqueous solution and stirring was continued for 5 minutes. The polymer was worked up as in Example IB. It had an inherent viscosity of 1.07 dl/g. It exhibited a softening range of the order of 350° C.

EXAMPLES III–VII

A variety of polyamide-imide polymers were prepared by the procedure of Example I. Property data for these polymers are recorded in Table I.

TABLE I

| Polymers of Example | Diamine | *Inherent Viscosity dl/g | Tensile Modulus at 25° C p.s.i. | Yield Strength at 25° C p.s.i. |
| --- | --- | --- | --- | --- |
| 3 | 2,2,4- and 2,4,4- Trimethylhexamethylene diamine (TMD) | 1.32 | 250,000 | 8,700 |
| 4 | Isophoronediamine (IPD) | 1.25 | 220,000 | 9,000 |
| 5 | 70/30 m-/p- Xylylenediamines (Sho-Amine-X) | 1.18 | 360,000 | 12,300 |
| 6 | Piperazine | 1.28 | — | — |
| 7 | 1,3-Bis(4′piperidyl) propane (4-DI-PIP) | 1.57 | 240,000 | 10,000 |

* 0.5 g of polymer in 100 ml. of m-cresol at 30° C.

I claim:

1. A process for preparing a linear polyamideimide consisting essentially of recurring units having the formula

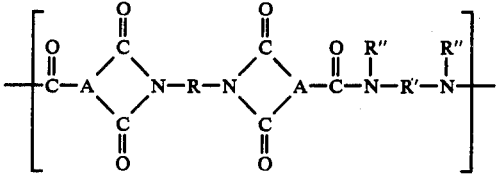

in which
A is an aromatic radical;
R and R' are araliphatic, aliphatic or cycloaliphatic radicals in which the carbon atoms attached to N are aliphatic carbon atoms;
R" is H, or an araliphatic, aliphatic or cycloaliphatic radical; or both R" radicals together form a divalent aliphatic radical; comprising the steps of
1. reacting an aromatic tricarboxylic acid anhydride having the formula

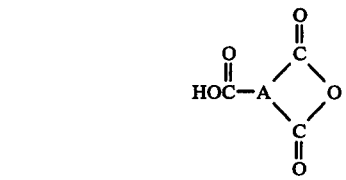

with a diamine of the formula

to form a diacid imide of the formula

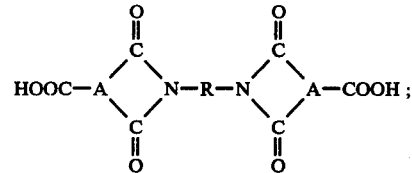

forming the corresponding acid halide derivative by converting the carboxyl groups in the diacid imide to halocarbonyl groups; and then polycondensing said acid halide derivative of the imide with an amine of the formula

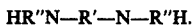

2. The process of claim 1 in which said aromatic tricarboxylic acid anhydride is trimellitic anhydride.

3. The process of claim 1 in which R is alkylene having 2 to 18 carbon atoms.

4. The process of claim 1 in which R' is alkylene having 2 to 18 carbon atoms and R" is H.

5. The process of claim 2 in which said aromatic tricarboxylic acid anhydride is trimellitic anhyhdride; R is alkylene having 2 to 18 carbon atoms; R' is alkylene having 2 to 18 carbon atoms and R" is H.

* * * * *